United States Patent

[11] 3,586,884

[72] Inventor Gerhard Gunter Gassmann
Berkheim, Germany
[21] Appl. No. 785,892
[22] Filed Dec. 23, 1968
[45] Patented June 22, 1971
[73] Assignee International Standard Electric Corporation
New York, N.Y.
[32] Priority Jan. 25, 1968
[33] Germany
[31] P 15 62 019.6

[54] CIRCUIT TO CONTROL THE DURATION OF PULSES
10 Claims, 5 Drawing Figs.

[52] U.S. Cl. .......... 307/265, 307/280, 307/300, 328/58
[51] Int. Cl. .......... H03k 1/18
[50] Field of Search .......... 307/265, 267, 280, 300; 328/58; 332/9 T

[56] References Cited

UNITED STATES PATENTS 3,048,785 8/1962 Cartier .......... 328/58 X
3,089,037 5/1963 Ross .......... 328/58 X
3,125,691 3/1964 Astheimer .......... 307/267 X
3,171,983 3/1965 Hickey .......... 307/300 X
3,317,755 5/1967 Briley .......... 307/267 X

*Primary Examiner*—Stanley D. Miller, Jr.
*Attorneys*—C. Cornell Remsen, Jr., Walter J. Baum, Percy P. Lantzy, Philip M. Bolton, Isidore Togut and Charles L. Johnson, Jr.

ABSTRACT: The duration of pulses may be controlled to have a given constant width, or a variable width to convey intelligence by the circuit of this invention. A semiconductor device receives a pulse input whose width is to be maintained constant or varied. A bias voltage, constant or variable, is coupled to the control electrode of said device to adjust the storage time thereof. The output of said device and the pulse input are coupled to an OR gate to produce either said constant or variable width pulse output. Negative feedback to the control electrode may be employed to compensate the pulse output for temperature variations.

INVENTOR
GERHARD-GÜNTER GASSMANN
BY Alfred C. Hill
AGENT

CIRCUIT TO CONTROL THE DURATION OF PULSES

BACKGROUND OF THE INVENTION

This invention relates to pulse generators and more particularly to a circuit to control the duration of pulses to produce constant width pulses, or variable width pulses to convey intelligence.

Circuits to limit the width or modulate the width of pulses generally incorporate monostable multivibrators. In such circuits, however, at least one capacitor is required. Furthermore, a multivibrator has two transistor circuits. Capacitors can only be manufactured by integrated circuit techniques with great difficulty or at relatively high cost, as is well known.

Pulse width limiters are also known which make use of the transit time along a delay line. Pulse width limiters of this type are very expensive and cannot be realized by integrated circuit techniques.

SUMMARY OF THE INVENTION

It is an object of the invention to provide a circuit to limit the width or modulate the width of pulses which are particularly suited for manufacture by integrated circuitry techniques.

A feature of this invention is the provision of a circuit to control the duration of pulses comprising a first source of input pulses; a semiconductor device (such as a transistor or diode) having at least an output electrode and a control electrode, the control electrode being coupled to the first source; a second source of control voltage coupled to the control electrode to control the storage time of the device; and a combining circuit coupled to the output electrode and the first source to provide output pulses of controlled duration.

Another feature of this invention includes a fixed value for the control voltage to provide constant width output pulses.

Still another feature of this invention includes a variable value (intelligence signal) for the control voltage to provide width modulated output pulses.

A further feature of this invention includes a negative feedback circuit coupled between the output of the combining circuit and the control electrode to compensate the output pulses for temperature variations.

The circuit of the invention has the advantage that it requires no capacitor for limiting or modulating the duration of pulses and is, therefore, particularly suited for manufacture by integrated circuit techniques. Furthermore, the circuit is particularly simple and, therefore, inexpensive, since it needs only one transistor circuit and two diodes.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENTS

Figure 1:
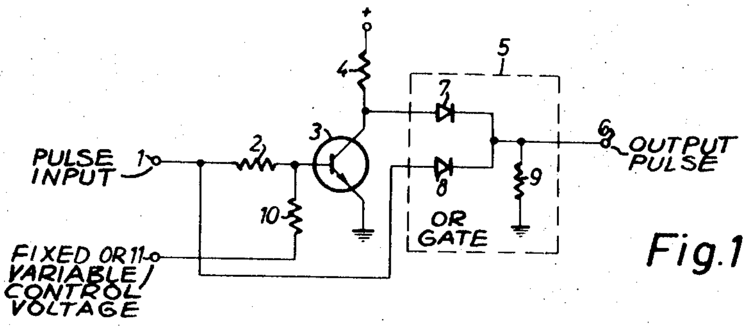
FIG. 1 is a schematic diagram of one embodiment of the circuit in accordance with the principles of this invention.

Referring to FIG. 1, 1 is the input of the circuit, to which the pulses to be modulated or limited are fed. These pulses are passed through coupling resistor 2 to the base electrode (control electrode) of transistor 3 which has a controllable storage time. 4 is the collector resistor of the transistor. The pulses appearing at the collector electrode (output electrode) and the pulses fed to terminal 1 are passed to OR circuit 5, which provides, at its output 6, the required width limited or modulated pulses. OR circuit 5 is of known construction and comprises two diodes 7 and 8 and resistor 9. However, any other type of OR circuit may be used. There is also fed to the base electrode of transistor 3, via the terminal 11 and base resistor 10, a fixed or variable DC (direct current) potential or a fixed DC potential on which the modulation signal is superimposed. In this way the storage time of transistor 3 is varied or modulated.

Figures 2A, 2B, 2C:
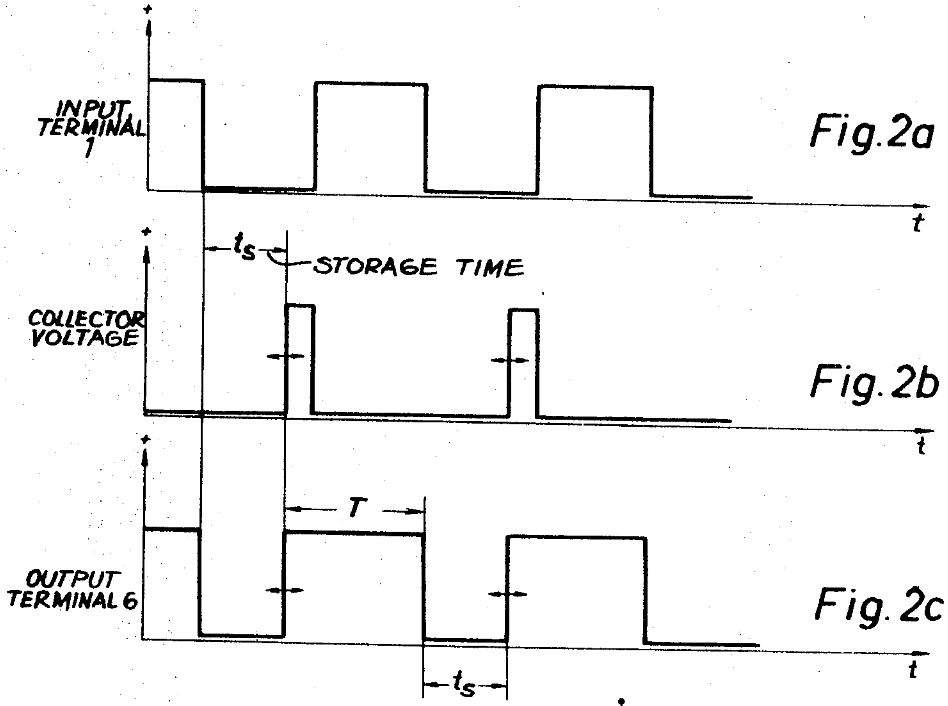
FIGS. 2*a* to 2*c* are timing diagrams useful in explaining the operation of the circuit of FIG. 1.

The operation of the circuit of the invention will now be described with reference to FIGS. 2*a* to 2*c*. FIG. 2*a* represents the voltage applied to terminal 1 in FIG. 1. FIG. 2*b* shows the voltage at the collector electrode of the transistor 3, which has a storage time $t_s$. Both voltages are fed to OR circuit 5, so that the voltage shown in FIG. 2*c* appears at output 6. This voltage can drop to approximately zero volts only during the storage time $t_s$, so that negative pulses, that is, pulses of negative direction, are produced having a pulse duration equal to the storage time $t_s$. If the storage time is constant due to a constant DC potential being applied to terminal 11, the circuit will act as a pulse width limiter, in which the voltage shown in FIG. 2*c* will have a constant nonfluctuating pulse width T in spite of fluctuations in the frequency and/or pulse width of the input voltage of FIG. 2*a*. If, however, a modulation signal is applied to the terminal 11, the storage time $t_s$ and, thus, the pulse width T of the voltage of FIG. 2*c* will fluctuate in rhythm with the modulation frequency.

Figure 3:
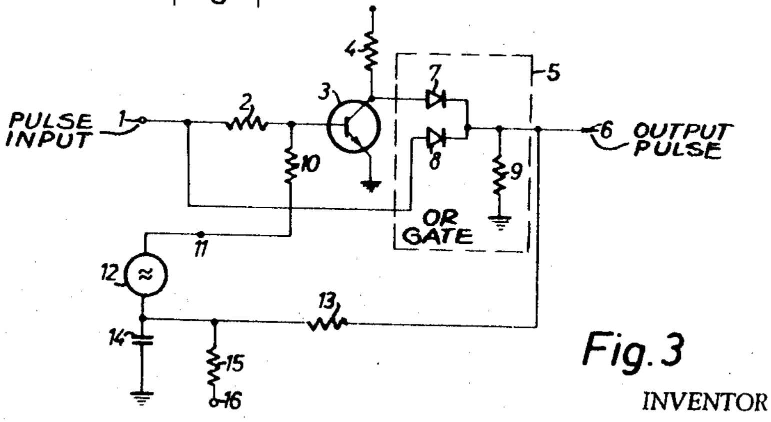
FIG. 3 is a schematic diagram of another embodiment of the circuit in accordance with the principles of this invention.

If temperature fluctuations are to be expected, measures must be taken to keep the storage time as independent of temperature as possible. This can be done, for example, by generating a voltage equal to the mean value of the outgoing pulses and by adding this mean value to the basic voltage for controlling the storage time of transistor 3. An embodiment of this is shown in FIG. 3. The circuit for generating the mean value and the modulating signal generator (variable control voltage) is separated from the circuit of this invention (components 1 to 10) suitable for integrated circuit technique.

Referring to FIG. 3, there is shown an extension of the circuit of FIG. 1 aiming at making the storage time less dependent on temperature. Like parts have like reference numerals. 12 is the generator of the modulation signal (e.g., a microphone), 13 and 14 is an RC-combination outside the integrated circuit and provides the mean value of the voltage shown in FIG. 2*c* appearing at output 6. The desired mean storage time is obtained by means of the DC potential applied to terminal 16 and passed through resistor 15 which has a relatively high resistance value. Generator 12 modulates the storage time. The mean value is also dependent on temperature. To reduce the influence of temperature, the mean value of the voltage obtained with the RC-combination 13, 14 is used to back-control the mean value of the storage time. The generation of the mean value may occur in any other suitable way. In this way, with appropriately small time constants for RC-combination 13, 14 there may be achieved a modulating negative feedback aiming at linearizing the modulation characteristic. If, for example, the ambient temperature rises, the storage time $t_s$ will increase and the mean value of the voltage at the output 6 will consequently fall. As a result the entire bias on the control electrode (base electrode) of transistor 3 will decrease which brings about a reduction of the storage time $t_s$. With a decrease of ambient temperature, the reverse of the above would occur.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit to control the duration of pulses comprising:

a first source of input pulses;

a semiconductor device having at least an output electrode and a control electrode, said control electrode being coupled to said first source;

a second source of control voltage coupled to said control electrode to control the storage time of said device; and a combining circuit coupled to said output electrode and said first source to combine said input pulse and an output pulse at said output electrode to provide output pluses of controlled duration.

2. A circuit according to claim 1, wherein
said second source provides a fixed value for said control voltage.

3. A circuit according to claim 1, wherein
said second source provides a variable value for said control voltage.

4. A circuit according to claim 3, wherein
said variable value includes intelligence signals.

5. A circuit according to claim 1, wherein
said device includes a transistor having its base electrode coupled to said first and second sources and its collector coupled to said combining circuit.

6. A circuit according to claim 1, wherein
said combining circuit includes an OR gate.

7. A circuit according to claim 1, further including
a negative feedback circuit coupled between the output of said combining circuit and said control electrode to compensate said output pulses for temperature variations.

8. A circuit according to claim 1, wherein
said second source provides a fixed value for said control voltage;
said combining circuit includes an OR gate; and
said device includes a transistor having its base electrode coupled to said first and second sources and its collector electrode coupled to said OR gate.

9. A circuit according to claim 1, wherein
said second source provides intelligence signals for said control voltage;
said combining circuit includes an OR gate; and
said device includes a transistor having its base electrode coupled to said first and second sources and its collector electrode coupled to said OR gate.

10. A circuit according to claim 1, wherein
said second provides intelligence signals for said control electrode;
said combining circuit includes an OR gate; and
said device includes a transistor having its base electrode coupled to said first and second sources and its collector electrode coupled to said OR gate; and
further including a negative feedback circuit coupled between the output of said OR gate and said base electrode to compensate said output pulses for temperature variations.